(12) United States Patent
Varia

(10) Patent No.: US 11,556,798 B2
(45) Date of Patent: Jan. 17, 2023

(54) OPTIMIZING MACHINE LEARNING MODEL PERFORMANCE

(71) Applicant: QUALCOMM Incorporated, San Diego, CA (US)

(72) Inventor: Meghal Varia, North York (CA)

(73) Assignee: Qualcomm Incorporated, San Diego, CA (US)

( * ) Notice: Subject to any disclaimer, the term of this patent is extended or adjusted under 35 U.S.C. 154(b) by 295 days.

(21) Appl. No.: 16/905,541

(22) Filed: Jun. 18, 2020

(65) Prior Publication Data

US 2020/0401898 A1 Dec. 24, 2020

Related U.S. Application Data

(60) Provisional application No. 62/863,099, filed on Jun. 18, 2019.

(51) Int. Cl.
*G06N 3/08* (2006.01)
*G06N 5/04* (2006.01)

(52) U.S. Cl.
CPC ............. *G06N 3/084* (2013.01); *G06N 5/046* (2013.01)

(58) Field of Classification Search
CPC ...... G06N 3/063; G06N 3/084; G06N 3/0454; G06N 5/003; G06N 5/046; G06N 3/08
See application file for complete search history.

(56) References Cited

U.S. PATENT DOCUMENTS 9,171,338 B2 * 10/2015 Chrapko ............. H04L 43/0811
9,443,004 B2 * 9/2016 Chan ................... H04L 43/0805
10,417,555 B2 * 9/2019 Brothers .................. G06N 3/10
2018/0300601 A1 * 10/2018 Cedola .................. G06F 9/4881
2018/0357546 A1 * 12/2018 Le ......................... G06N 3/0454

OTHER PUBLICATIONS

Alwanim., et al., "Fused-Layer CNN Accelerators," 49th Annual IEEE/ACM InternationalSymposium on Microarchitecture (MICRO), Oct. 15, 2016 (Oct. 15, 2016), 12 pages, XP055573938, DOI: 10.1109/MICRO.2016.7783725, ISBN: 978-1-5090-3508-3.
Goetschalckx K., et al., "Breaking High-Resolution CNN Bandwidth Barriers with Enhanced Depth-First Execution", IEEE Journal On Emerging And Selected Topics In Circuits And Systems, IEEE, Piscataway, NJ, USA, vol. 9, No. 2, Mar. 15, 2019 (Mar. 15, 2019), pp. 323-331, XP011729341, ISSN: 2156-3357, DOI: 10.1109/JETCAS.2019.2905361 [retrieved on Oct. 6, 2019].
International Search Report and Written Opinion—PCT/US2020/038522—ISA/EPO—dated Nov. 20, 2020.
Kandemir M., et al., "Dynamic Management of Scratch-Pad Memory Space", Proceedings of the 38th Annual Design Automation Conference (DAC), Las Vegas, NV, Jun. 18-22, 2001; [Proceedings of the Design Automation Conference], New York, NY: ACM, US, Jun. 22, 2001 (Jun. 22, 2001), pp. 690-695, XP058180247, DOI: 10.1145/378239.379049, ISBN: 978-1-58113-297-7.
Partial International Search Report—PCT/US2020/038522—ISA/EPO—dated Sep. 30, 2020.

* cited by examiner

*Primary Examiner* — Abdullahi E Salad
(74) *Attorney, Agent, or Firm* — Patterson & Sheridan, L.L.P

(57) ABSTRACT

Certain aspects of the present disclosure provide techniques for receiving data defining a neural network; analyzing the data to determine a depth-first cut point for a depth-first traversal portion of an overall network traversal; performing depth-first traversal for the depth-first portion of the overall network traversal; and performing layer-based traversal for a layer-based portion of the overall network traversal.

16 Claims, 14 Drawing Sheets

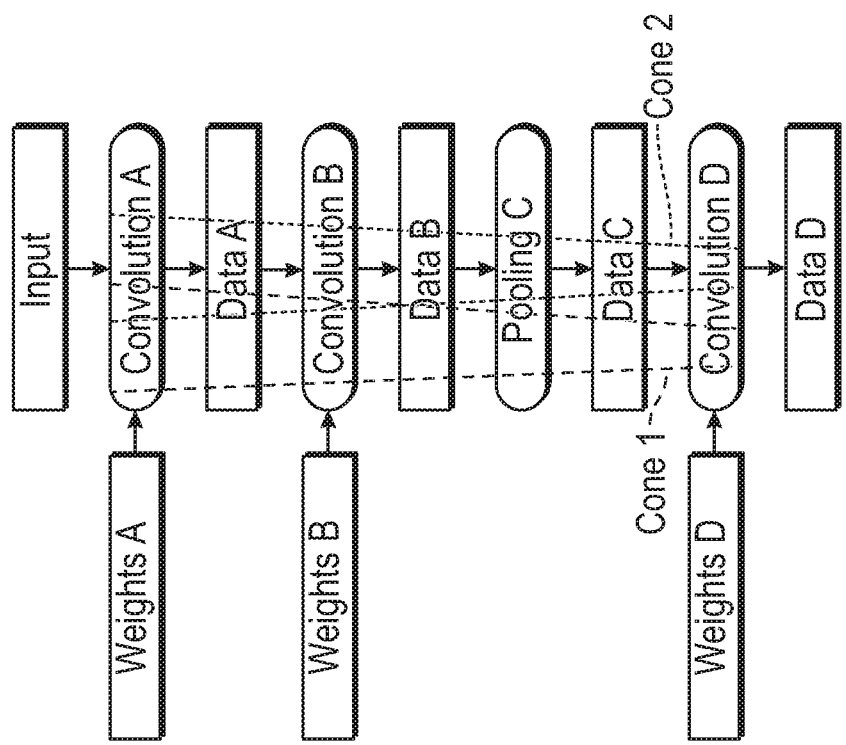
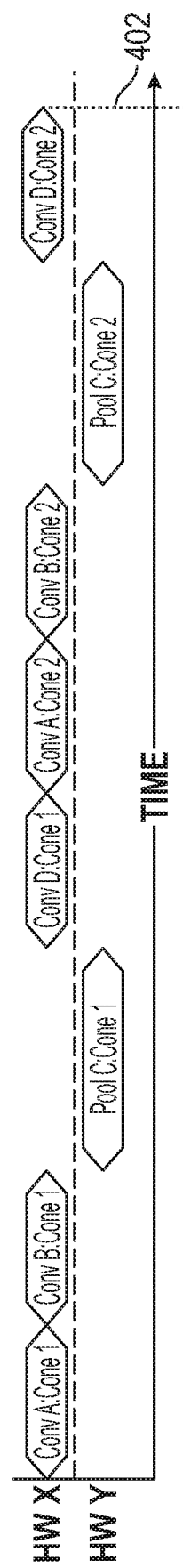
FIG. 4A
FIG. 4B

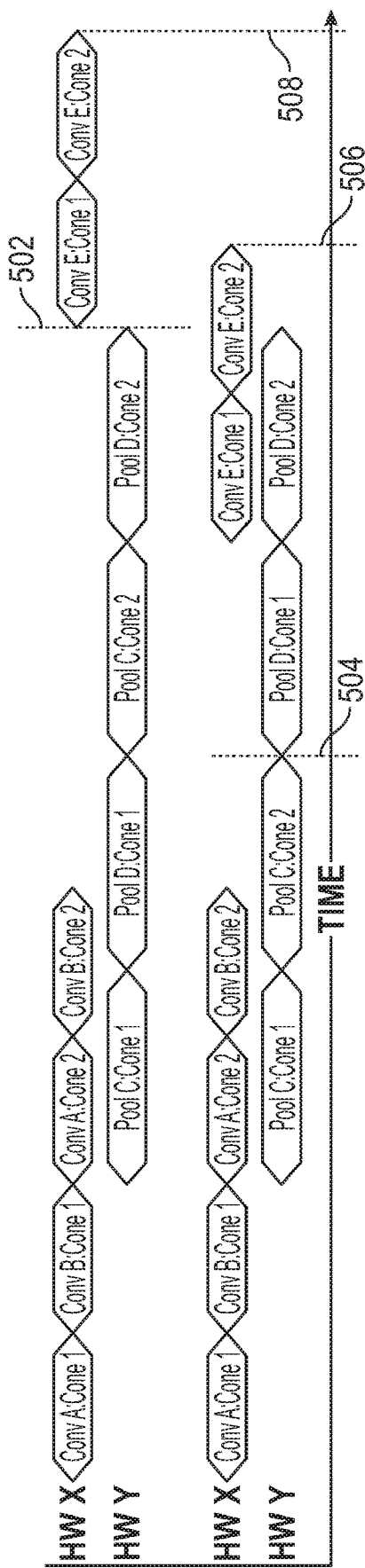
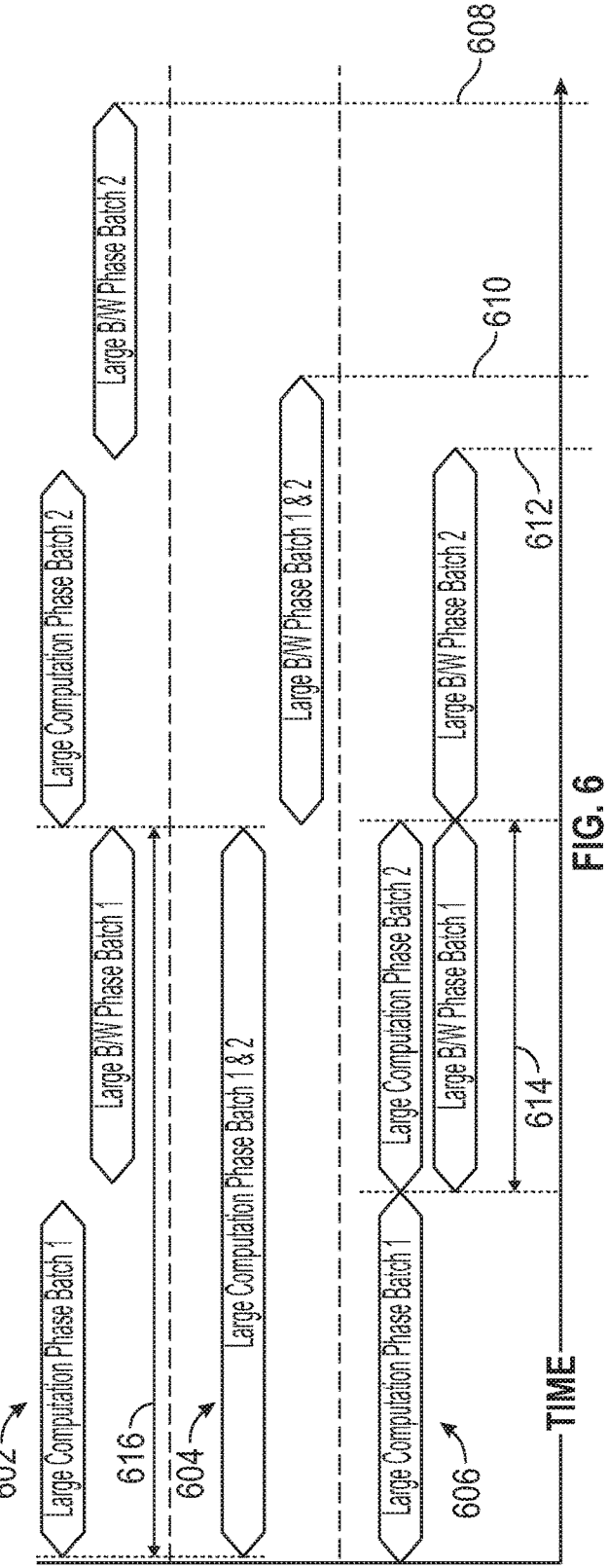
FIG. 5B
FIG. 6

OPTIMIZING MACHINE LEARNING MODEL PERFORMANCE

CROSS-REFERENCE TO RELATED APPLICATIONS

This application claims the benefit of U.S. Provisional Patent Application No. 62/863,099, filed on Jun. 18, 2019, the entire contents of which are incorporated herein by reference.

INTRODUCTION

Aspects of the present disclosure relate to optimizing machine learning model performance.

Machine learning generally produces a trained model (e.g., an artificial neural network, a tree, or other structures), which represents a generalize fit to a set of training data that is known a priori. Applying the trained model to new data produces inferences, which may be used to gain insight into the new data. In some cases, applying the model to the new data is described as "running an inference" on the new data.

Many types of computational hardware blocks may be used to run an inference, including, for example: a central processing unit (CPU), a graphics processing unit (GPU), a digital signal processor (DSP), a neural processing unit (NPU), a field programmable gate array (FPGA), an application specific integrated circuit (ASIC), and other custom hardware.

Key performance indicators (KPIs) may quantify the performance of a trained model, such as the "quality" and "efficiency" of an inference from a trained model. For example, accuracy of the inference, speed of the inference, size of the inference, power consumed by a device performing an inference, hardware utilization and bandwidth by a device performing an inference, and others are examples of KPIs.

Generally, optimization of one KPI comes at the expense of one or more other KPIs. Accordingly, what are needed are systems and methods for improving trained model performance so that KPIs can be simultaneously improved.

BRIEF SUMMARY

In a first aspect, embodiments described herein include a method, comprising: receiving data defining a neural network; analyzing the data to determine a depth-first cut point for a depth-first traversal portion of an overall network traversal; performing depth-first traversal for the depth-first portion of the overall network traversal; and performing layer-based traversal for a layer-based portion of the overall network traversal.

In a second aspect, embodiments described herein include a method, comprising: receiving data defining a neural network; receiving hardware characteristic data defining a plurality of hardware resources, including a local memory capacity; analyzing the data to determine a cut point for a depth-first traversal portion of an overall network traversal; determining a first cut point based at least in part on the data and the local memory capacity, wherein the first cut point is at a maximum depth of the neural network given the local memory capacity; determining a second cut point, wherein the second cut point is shallower than the first cut point, and wherein the second cut point increases hardware parallelism compared to the first cut point; and performing depth-first traversal for the depth-first portion of the overall network traversal using two or more hardware resources of the plurality of hardware resource and the second cut point.

In a third aspect, embodiments described herein include a method, comprising: performing, during a first time interval, a computational phase of a first inference on a first hardware resource; performing, during a second time interval, transport phase of the first inference on a second hardware resource; performing, during the second time interval, a computational phase of a second inference on the first hardware resource; and performing, during a third time interval, a transport phase of the second inference on the second hardware resource.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 4A and 4B depicts an example of a conventional hardware parallelization scheme for convolution computation.

FIGS. 5A and 5B depicts an example of a depth-first cut optimization for a hardware parallelization scheme for convolution computation.

FIG. 6 depicts examples of batching optimizations to improve hardware parallelism.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
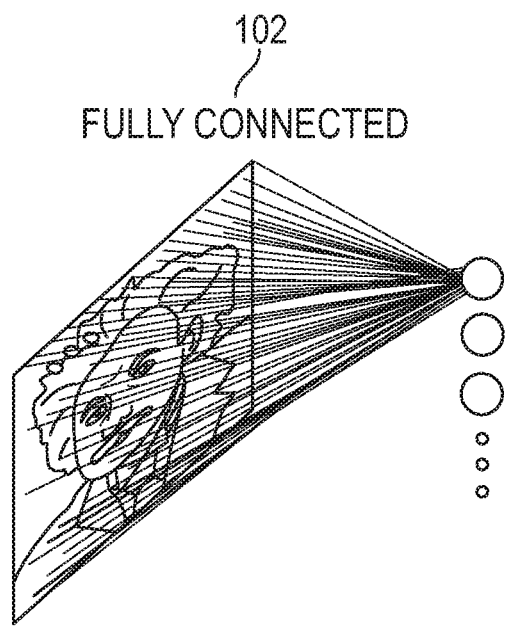
FIG. 1A-1D depict examples of various types of neural networks.

Aspects of the present disclosure provide apparatuses, methods, processing systems, and computer readable mediums for optimizing the performance of machine learning models, such as neural networks, in hardware.

In particular, aspects provided herein allow for determining whether data between portions (e.g., layers) of a neural network model needs to be written out to a non-local memory (e.g., a host system memory, such as a DRAM, or the like) or whether it can be stored in a local-memory (e.g., a tightly-coupled memory), which improves access speed, lowers system data bus utilization, and reduces power consumption.

Aspects provided herein may improve depth-first network traversal of neural networks. Generally, depth-first traversal refers to proceeding depth-first through multiple layers of a neural network to minimize intermediate memory bandwidth. Depth-first traversal seeks to produce and consume intermediate neural network data in such a way that it does not need to be offloaded to and reloaded from a non-local memory unnecessarily. More specifically, depth-first traversal seeks to minimize power- and time-consuming operations of writing out to a host processing system memory (e.g., DRAM) the activation outputs of one layer and then reading from that host processing system memory those outputs as inputs to a subsequent layer. For example, U.S. patent application Ser. No. 16/443,695, filed Jun. 17, 2019, entitled "Depth-First Convolution in Deep Neural Networks", which is incorporated herein by reference in its entirety, discloses methods for depth-first traversal.

In conventional depth-first approaches for processing a neural network model, the data between two different portions of the neural network model (including two different depth-first portions) are written out to a non-local memory (spilled) and then read back in (filled) to a local memory for processing. This process requires time, thus adding latency to processing, and power, the increasing overall power use (and reducing power efficiency) of processing. Thus, conventional depth-first processing of neural models is not able to take advantage of making a depth-first section shallower if it permits the ability to save ("pin") the data between the depth-first sections. Aspects described herein consider this benefit during processing (e.g., when determining a cut point between model portions) to improve speed (e.g., by reducing memory latency) and lower power use (e.g., by reducing writing to and reading from the memory). Notably, aspects described herein are usable in multi-phase neural network models using different batching schemes.

Deep Neural Networks and Deep Learning

Deep learning architectures may perform complex tasks, such as object recognition, by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach for a task may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. For example, in feed-forward networks, information is passed from lower to higher layers, with each neuron in a given layer communicating to neurons in higher layers. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 1A illustrates an example of a fully connected neural network 102. In a fully connected neural network 102, a neuron in a first layer may communicate its output to every neuron in a second layer, so that each neuron in the second layer will receive input from every neuron in the first layer.

Figure 1B:
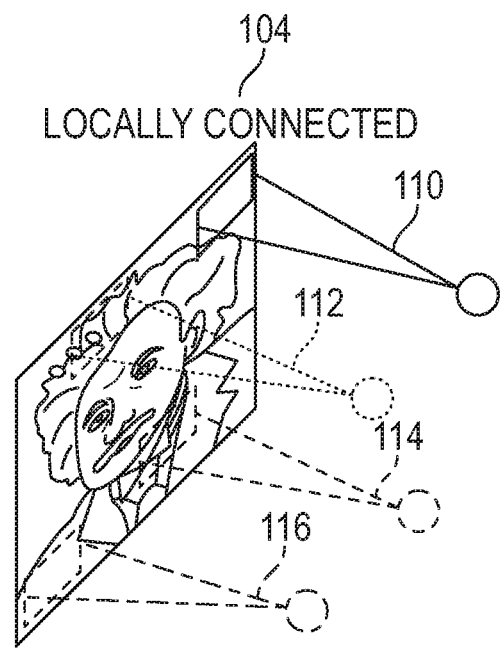

FIG. 1B illustrates an example of a locally connected neural network 104. In a locally connected neural network 104, a neuron in a first layer may be connected to a limited number of neurons in the second layer. More generally, a locally connected layer of the locally connected neural network 104 may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Figure 1C:
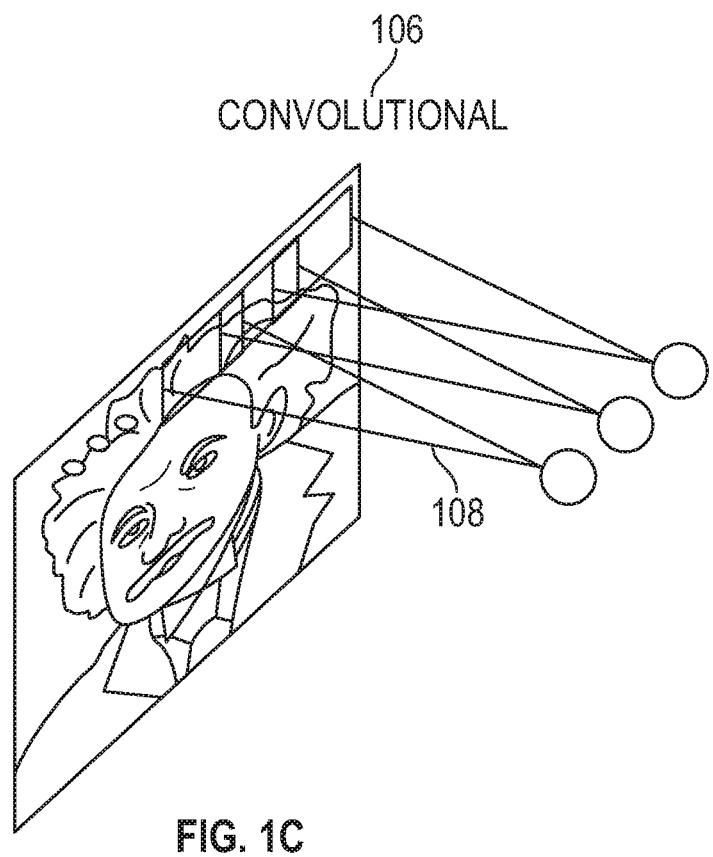

One example of a locally connected neural network is a convolutional neural network. FIG. 1C illustrates an example of a convolutional neural network 106. The convolutional neural network 106 may be configured such that the connection strengths associated with the inputs for each neuron in the second layer are shared (e.g., 108). Convolutional neural networks may be well suited to problems in which the spatial location of inputs is meaningful.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

One type of convolutional neural network is a deep convolutional network (DCN). Deep convolutional networks (DCNs) are networks of convolutional layers, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Figure 1D:
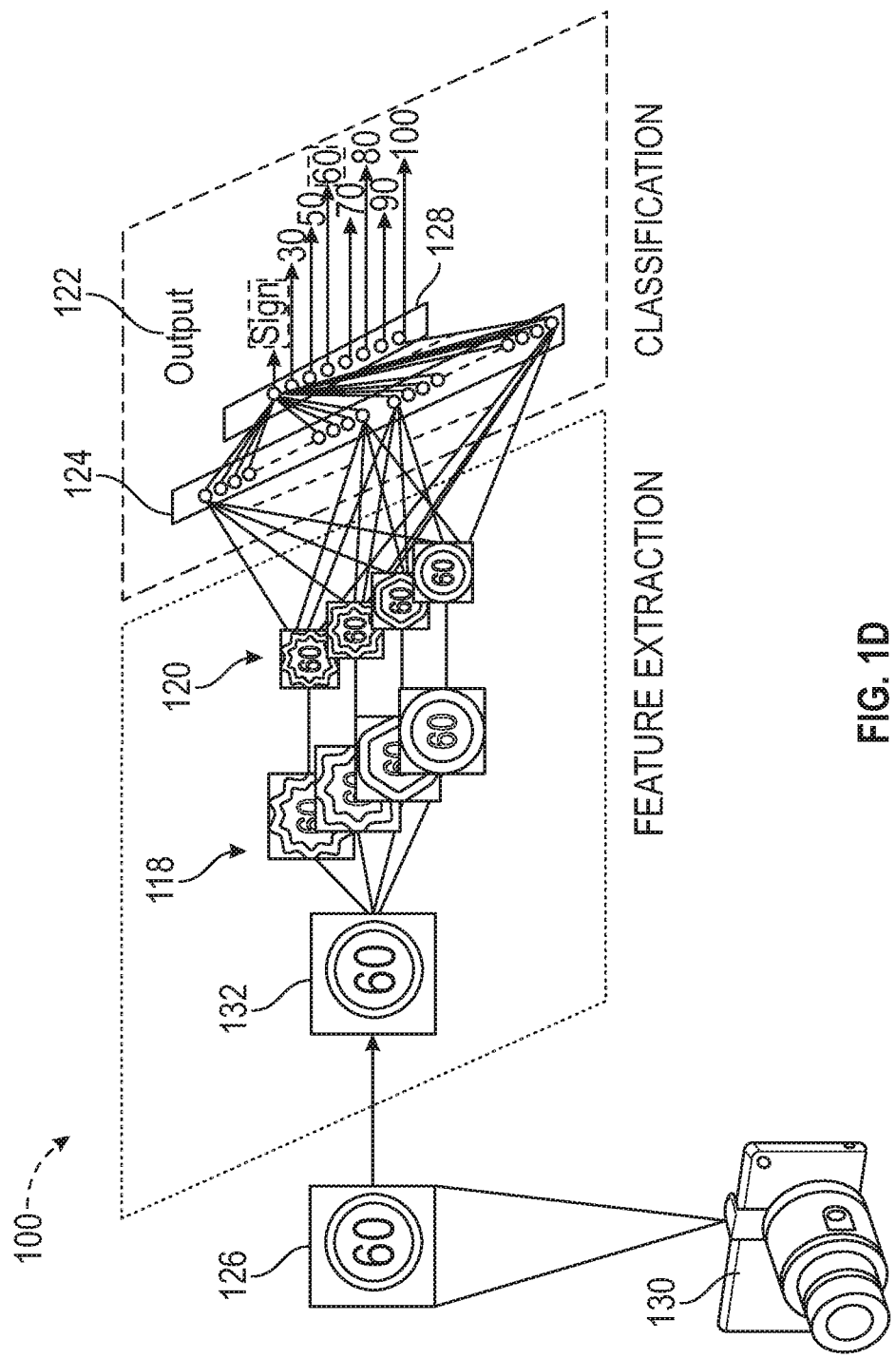

FIG. 1D illustrates a detailed example of a DCN 100 designed to recognize visual features from an image 126 input from an image capturing device 130, such as a car-mounted camera. The DCN 100 of the current example may be trained to identify traffic signs and a number provided on the traffic sign. Of course, the DCN 200 may be trained for other tasks, such as identifying lane markings or identifying traffic lights. These are just some example tasks, and many others are possible.

DCN 100 may be trained with supervised learning. During training, the DCN 100 may be presented with an image, such as the image 126 of a speed limit sign, and a forward pass may then be computed to produce an output 122. DCN 100 may include a feature extraction section and a classification section. Upon receiving the image 126, a convolutional layer 132 may apply convolutional kernels (not shown) to the image 126 to generate a first set of feature maps 118. As an example, the convolutional kernel for the convolutional layer 132 may be a 5×5 kernel that generates 28×28 feature maps. In the present example, because four different feature maps are generated in the first set of feature maps 118, four different convolutional kernels were applied to the image 126 at the convolutional layer 132. The convolutional kernels may also be referred to as filters or convolutional filters.

The first set of feature maps 118 may be subsampled by a max pooling layer (not shown) to generate a second set of feature maps 120. The max pooling layer reduces the size of the first set of feature maps 118. That is, a size of the second set of feature maps 120, such as 14×14, is less than the size of the first set of feature maps 118, such as 28×28. The reduced size provides similar information to a subsequent layer while reducing memory consumption. The second set of feature maps 120 may be further convolved via one or more subsequent convolutional layers (not shown) to generate one or more subsequent sets of feature maps (not shown).

In the example of FIG. 1D, the second set of feature maps 120 is convolved to generate a first feature vector 124. Furthermore, the first feature vector 124 is further convolved to generate a second feature vector 128. Each feature of the second feature vector 128 may include a number that corresponds to a possible feature of the image 126, such as "sign," "60," and "100." A softmax function (not shown) may convert the numbers in the second feature vector 228 to a probability. As such, an output 122 of the DCN 100 is a probability of the image 126 including one or more features.

In the present example, the probabilities in the output 122 for "sign" and "60" are higher than the probabilities of the others of the output 122, such as "30," "40," "50," "70," "80," "90," and "100". Before training, the output 122 produced by DCN 100 is likely to be incorrect. Thus, an error may be calculated between the output 122 and a target output. The target output is the ground truth of the image 126 (e.g., "sign" and "60"). The weights of DCN 100 may then be adjusted so the output 122 of DCN 100 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, DCN 100 may be presented with new images and a forward pass through the network may yield an output 122 that may be considered an inference or a prediction of the DCN.

Finally, deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Figure 2:
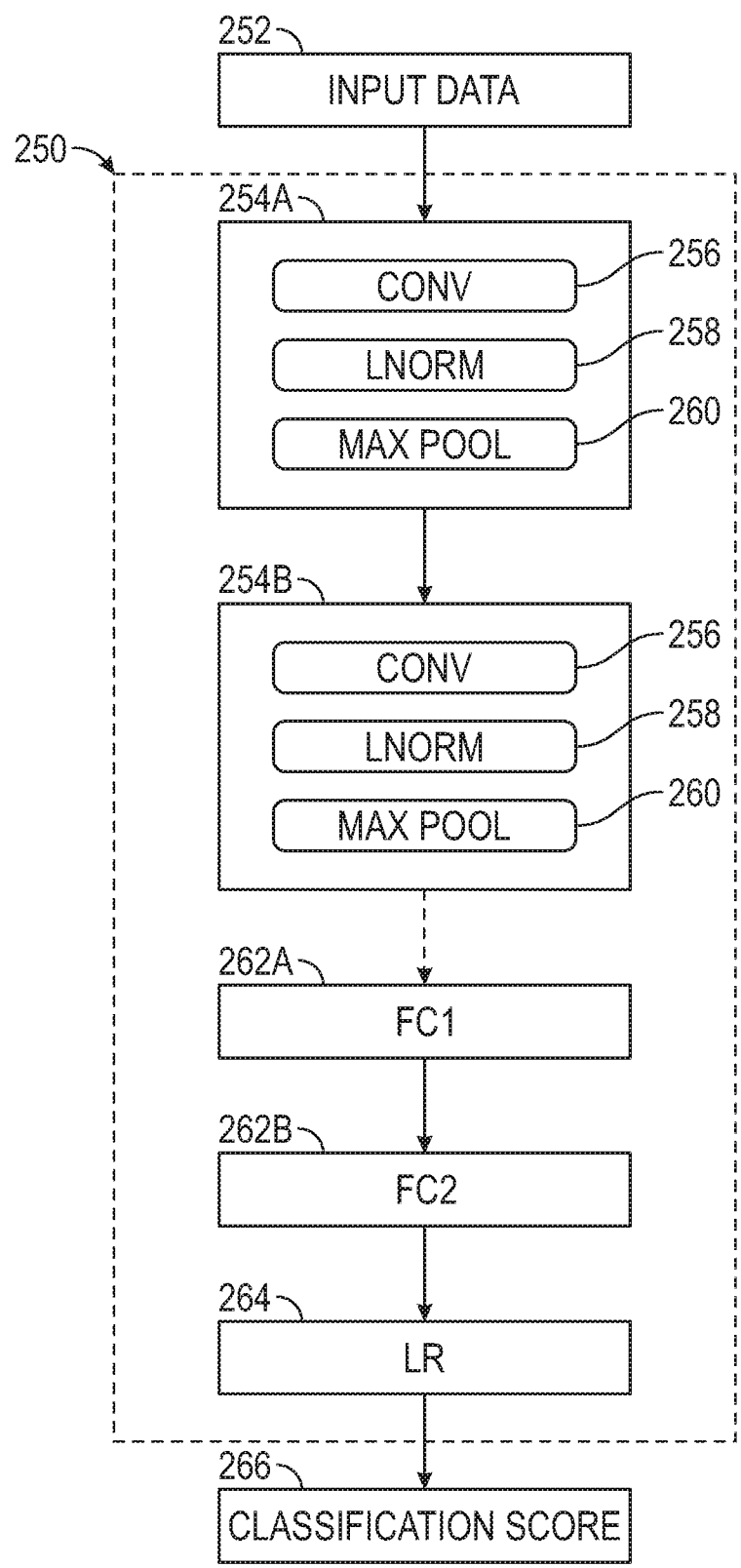
FIG. 2 is a block diagram illustrating an exemplary deep convolutional network.

FIG. 2 is a block diagram illustrating an exemplary deep convolutional network 250. The deep convolutional network 250 may include multiple different types of layers based on connectivity and weight sharing. As shown in FIG. 2, the deep convolutional network 250 includes the convolution blocks 254A and 254B. Each of the convolution blocks 254A and 254B may be configured with a convolution layer (CONV) 256, a normalization layer (LNorm) 258, and a max pooling layer (MAX POOL) 260.

The convolution layers 256 may include one or more convolutional filters, which may be applied to the input data 252 to generate a feature map. Although only two convolution blocks 254A and 254B are shown, the present disclosure is not so limiting, and instead, any number of convolution blocks (e.g., blocks 254A and 254B) may be included in the deep convolutional network 250 according to design preference. The normalization layer 258 may normalize the output of the convolution filters. For example, the normalization layer 258 may provide whitening or lateral inhibition. The max pooling layer 260 may provide down sampling aggregation over space for local invariance and dimensionality reduction.

The parallel filter banks, for example, of a deep convolutional network may be loaded onto one or more processors of a processing device, such as described below with respect to FIG. 10, to achieve high performance and low power consumption.

The deep convolutional network 250 may also include one or more fully connected layers, such as layer 262A (labeled "FC1") and layer 262B (labeled "FC2"). The deep convolutional network 250 may further include a logistic regression (LR) layer 264. Between each layer 256, 258, 260, 262, 264 of the deep convolutional network 250 are weights (not shown) that are to be updated. The output of each of the layers (e.g., 256, 258, 260, 262, and 264) may serve as an input of a succeeding one of the layers (e.g., 256, 258, 260, 262, and 264) in the deep convolutional network 250 to learn hierarchical feature representations from input data 252 (e.g., images, audio, video, sensor data, and/or other input data) supplied at the first of the convolution blocks 254A. The output of the deep convolutional network 250 is a classification score 266 for the input data 252. The classification score 266 may be a set of probabilities, where each probability is the probability of the input data including a feature from a set of features.

Model Inference Performance Strategies

Running an inference using a trained machine learning model (such as those described above) on a processing system may involve a series of steps that are amenable to optimization. For example, in the context of neural network-based models, many layers of the model may need processing and the order and manner in which the layers are processed may be manipulated to address different KPIs, such as speed, accuracy, power use, and others.

One strategy, known as layer-based mapping, maps each layer of a neural network to a hardware resource so that the layer is processed completely by that resource prior to the next layer. Unfortunately, this strategy may require significant bandwidth as related data may needs to be loaded and unloaded again and again throughout the processing of various layers. For example, in networks using large images as input data, intermediate data (e.g., activations and/or feature maps) may not fit in a local memory (e.g., local to the hardware resource), and hence they have to be unloaded to another memory, such as a host system memory (e.g., DDR). This issue is particularly acute for convolutional neural networks, where overlapping data is used for the convolutions. The significant memory bandwidth increases power usage, which may be a significant hindrance in mobile device applications. Further, the significant memory bandwidth may clog the various memory pathways, causing other processes to slow or stall on the host processing system.

Further yet, assigning a whole layer to a single hardware resource does not maximize parallelism of hardware resources, which may lead to fewer inferences per unit time (an example of a KPI). Modern electronic devices often have a plurality of hardware resources, such as CPUs, GPUs, DSPs, NPUs, FPGAs, ASICs, and other custom hardware (and in some cases multiple hardware resources within the aforementioned higher-level hardware resources, such as multiple matrix processors on a given ASIC) that can be leveraged for running inferences on models. Better performance may be achieved by simultaneously leveraging these resources through improved parallelization.

As above, another strategy for traversing a neural network is depth-first traversal, which generally proceeds depth-first through multiple layers of a neural network to minimize time and power associated with moving data out to a host processing memory (e.g., spilling the data) and then moving the data back in from the host processing memory (e.g., filling the data) between layers. However, maximizing the depth in a depth-first strategy may not minimize bandwidth used when the amount of data produced (e.g., intermediate data, such as activations and feature maps) exceeds the a local memory capacity of the processing hardware, such that data needs to be written to and later retrieved from another, non-local memory (e.g., DDR for the host processing system). Further, maximizing the depth may also negatively impact inferences per second.

Yet another strategy is batching, which is used to reduce the overhead of memory fetching as compared with computation for an inference. For example, if computing two inferences at a time, batching saves the bandwidth required for weight fetching because fetching the weights once can be used for both inferences. Nevertheless, in certain networks, this strategy does not yield optimal KPIs, such as inferences per second (IPS).

Embodiments described herein improve the performance of layer-based, depth-first, and batching strategies such that model performance can be improved. In particular, methods described herein may improve some KPIs (e.g., IPS and memory bandwidth usage) without sacrificing other KPIs.

Hybrid Depth-First and Full-Layer Computation Traversal

Figure 3A:
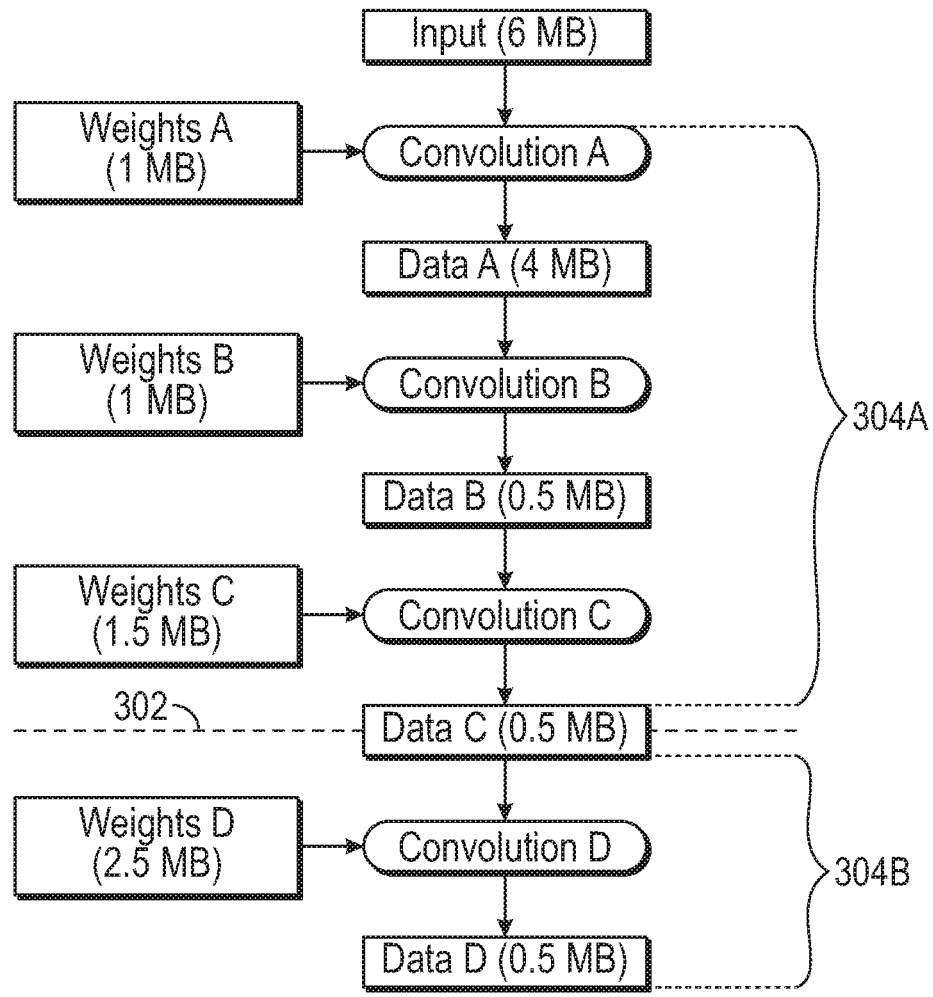
FIG. 3A depicts an example of a conventional depth-first network traversal strategy.

Conventional depth-first traversal of a neural network maximizes the sub-graph sizing (i.e. the number of layers processed) and "spills" the data at a cut-point in the neural network architecture to a non-local memory when the layer data does not fit into a local memory, such as a tightly-coupled memory (TCM), such as an SRAM TCM, associated with the hardware resource performing the processing of the neural network portion (e.g., sub-graph). The spilled data is subsequently read back into the local memory for the next portion (e.g., sub-graph) of the neural network to be processed. FIG. 3A depicts an example of this strategy, which may be referred to as a greedy strategy.

In particular, in FIG. 3A, assuming a 4 MB local memory, depth-first traversal would yield a cut at 302, which defines the extent of subgraph 304A, and Data C (0.5 MB worth) would be "spilled" into a non-local memory, such as a DDR memory. In this example, Data C is spilled at cut point 302 because Weights A+B+C+D (6 MB total) cannot fit into the local memory (4 MB), and, similarly, Weights A+B+C+Data C would fill the entire local memory (4 MB) and leave no room for convolution data (e.g., convolution cone data).

Data C is later "filled" back into the local memory for Convolution D in subgraph 304B. Notably, the spill and fill back and forth requires twice the size of the data as memory bandwidth, so in this case, spilling 0.5 MB of data and then filling 0.5 MB of data results in 1 MB worth of memory bandwidth usage.

Similarly, for layer-based traversal with the same 4 MB local memory, Data A would need to be spilled and filled because Weights A (1 MB) and Data A (4 MB) exceed the local memory capacity of 4 MB.

In some implementations, the local memory may be a tightly-coupled memory (TCM), which is generally a small, dedicated memory region that is very close to a processor. The benefit of a TCM's proximity to a processor is that the processor can access the TCM every cycle, and, unlike non-local memory, there is no cache involved which makes all memory accesses predictable. Further, fetching data from the TCM is significantly more power efficient compared to fetching the data from a non-local memory, such as a system memory (e.g., DDR).

Figure 3B:
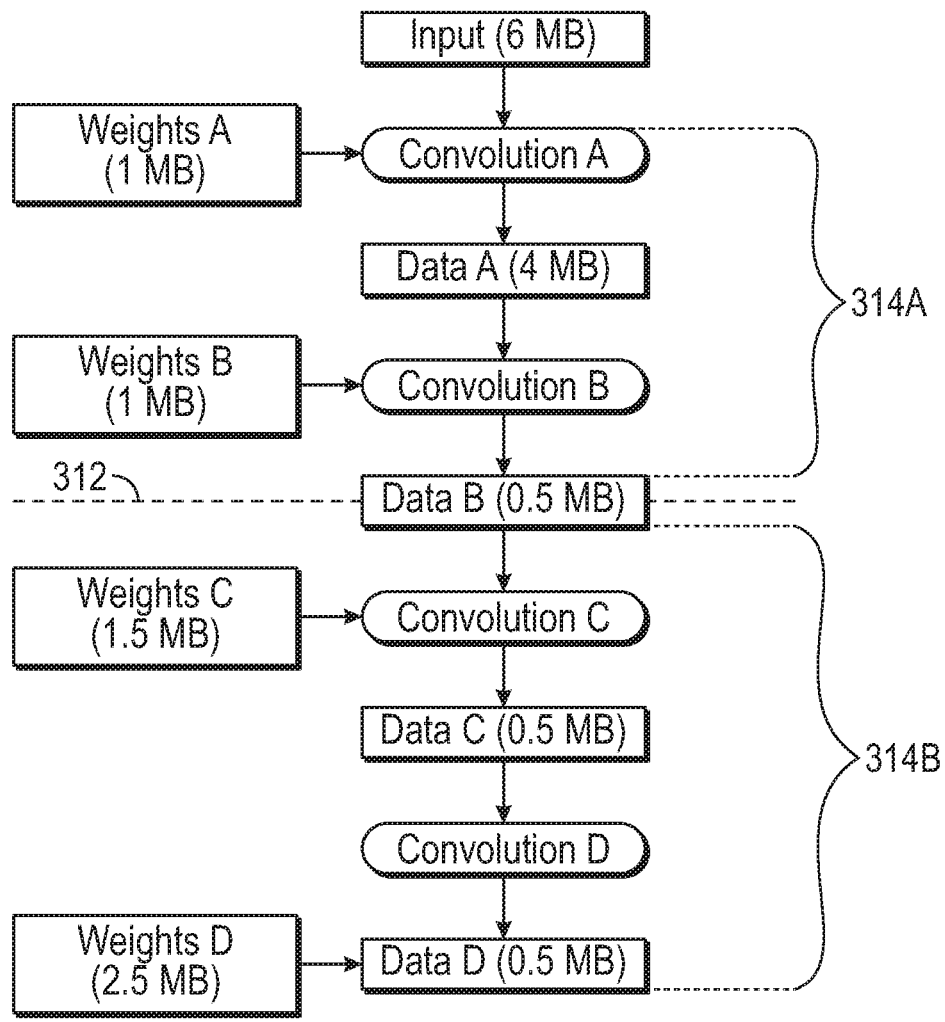
FIG. 3B depicts an example of a hybrid depth-first and full layer traversal strategy.

FIG. 3B depicts a hybrid depth-first and full-layer traversal scheme in which cut point 312 is selected so that depth-first traversal can be applied to the first subgraph 314A, and full-layer traversal can be applied to the second subgraph 314B. In doing so, memory bandwidth is minimized because spilling and filling (as described with respect to FIG. 3A) is avoided. In other words, FIG. 3B depicts an example of selecting a cut point so that model data can be stored in local memory during processing (thereby avoiding memory bandwidth utilization), rather than selecting a cut point that only maximizes attainable depth in the model based on the available memory. This improves memory bandwidth utilization.

In particular, in this hybrid scheme, Data B (0.5 MB), Weights A (1 MB), Weights B (1 MB), and convolution cone data (<0.5 MB) (not depicted) are stored in the local memory instead of writing these data out to a non-local memory. Thus, in this hybrid scheme, the amount of convolution cone data may be considered when determining a cut point. Saving these data in the local memory saves the bandwidth of spilling the data out to a non-local memory, such as a DDR memory.

The amount of convolution cone data is based on many factors. For example, to produce a minimum size piece at the end of the convolution cone, a larger piece is needed at the beginning of the convolution cone. The minimum size piece may be based on a hardware configuration (e.g., a piece of hardware may be very inefficient if calculating a piece less than some number of KB). The larger piece sizes through the various layers of the convolution cone are based on the nature of the computations. For example, a stride by two convolution may increase the size by approximately 2×.

After cut point 312, the last two layers, including Convolutions C and D, are processed in a layer-based manner, thus the "hybrid" approach. A layer-based approach is beneficial here because Weights C+Data C=2 MB and Weights D+Data D=3 MB, which are both lower than the 4 MB local memory capacity. Thus, the total data in Convolutions C and D are small enough to avoid any further spilling and filling, and memory bandwidth is thereby improved. In other words, by considering smaller depth subgraphs, the data (e.g., the weights and data) may be "pinned" to the local memory (e.g., TCM) between subgraphs so spilling and filling from a non-local memory is not necessary. Note that the shortest subgraph may be a layer, but this need not be the case.

In order to implement this hybrid scheme, a compiler may receive neural network data and hardware characteristic data (e.g., including local memory size) and use both in order to select cut point 312.

Parallelizing Multiple Hardware Compute Resources

Conventional depth-first traversal also maximizes neural network model sub-graph sizing without regard to balancing resource utilization between sub-graphs and without running multiple parts of the sub-graph in parallel (e.g., convolution cone parallelization). Similarly, conventional layer-based traversal does not attempt to simultaneously compute layers of the neural network model that may be mapped to different processing hardware resources.

An improvement to conventional methods is to process multiple layers of a neural network model at a time, and to select those layers with consideration for balancing hardware resource utilization between model sub-graphs and using additional local memory to achieve convolution cone parallelization (and thus possibly reduced sub-graph size).

For example, FIG. 4A depicts an example convolutional neural network processing scheme and FIG. 4B depicts a timing diagram for the processing steps in FIG. 4A. In this example, convolution is performed on hardware resource X (HW X) and pooling is performed on hardware resource Y (HW Y).

Notably, without taking advantage of hardware parallelization, conventional depth-first schemes would not select a cut point, which would yield a timing diagram as in FIG. 4B (related to example convolution cones 1 and 2). As depicted, the completion time for this example is at time 402.

Figure 4C:
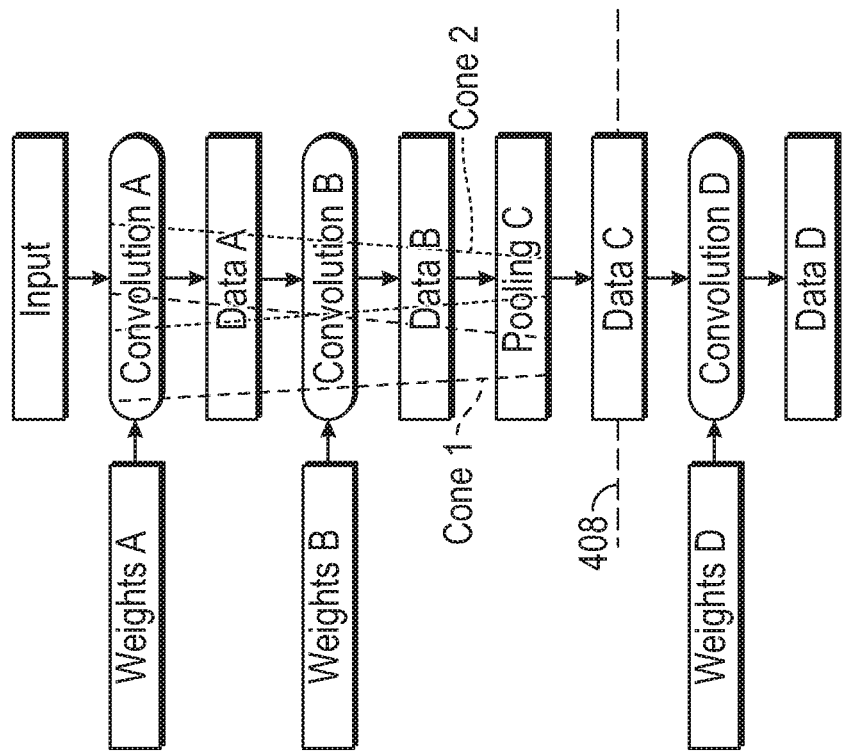
FIGS. 4C and 4D depicts an example of an improved hardware parallelization scheme for convolution computation.
Figure 4D:
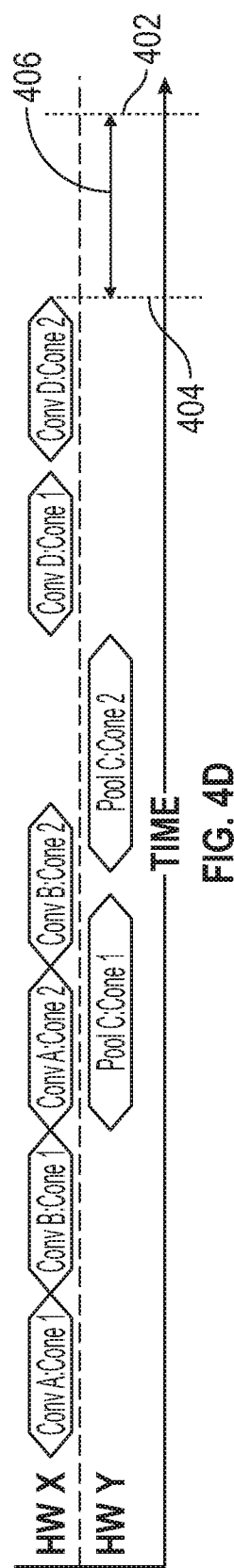

By contrast FIG. 4C depicts an example in which a cut point 408 is selected in order to have sufficient local memory for convolution cone parallelization (e.g., for indicated convolution cones 1 and 2). As shown in FIG. 4D, this optimization results in an improved completion time of 404, which represents an interval improvement of 406 over the conventional method (which takes until time 402 as depicted in FIG. 4B).

Thus, allowing for multiple parallel convolution cones of traversal may improve hardware parallelism, which in-turn, reduces completion time.

Figure 5A:
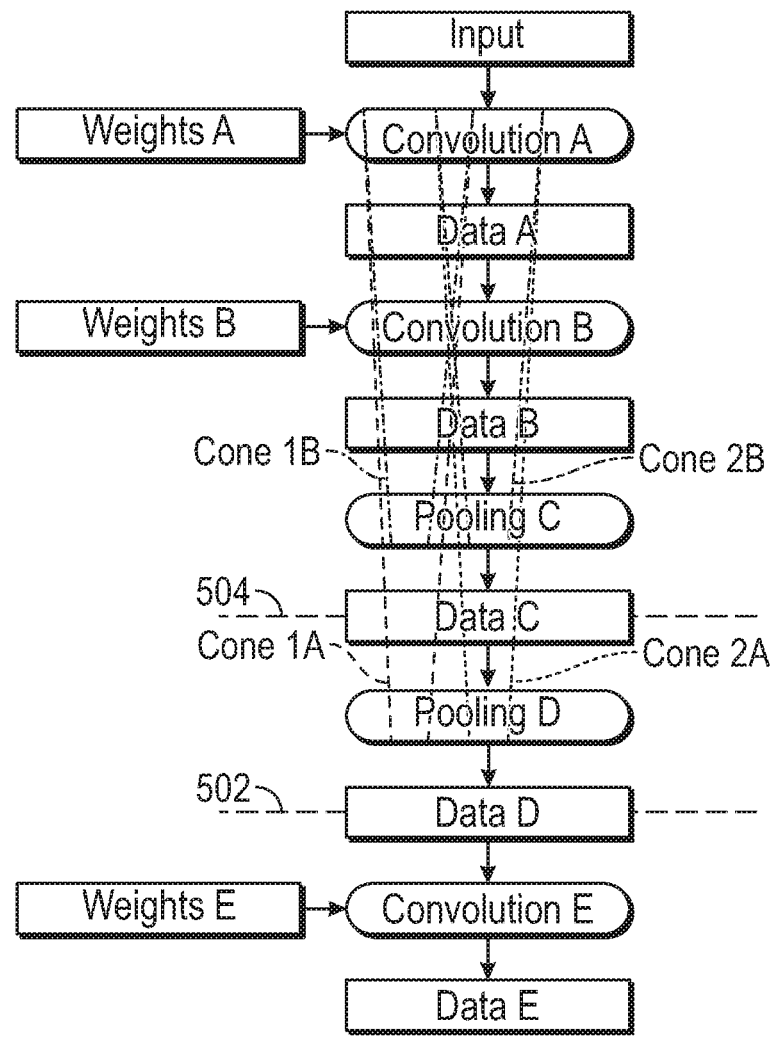

FIGS. 5A and 5B depict another example comparing hardware parallelization with conventional depth-first traversal cut selection and hardware parallelization with a cut selection chosen to maximize parallelization. In this example, hardware X (HW X) is mapped for convolution computation while hardware resource Y (HW Y) is mapped for pooling.

A conventional depth-first traversal may select a cut point of 502, which represents the deepest part of the graph that can be reached given the available resources (e.g., as discussed above with respect to FIG. 3A). The timing diagram in FIG. 5B shows that this strategy results in a completion time for two example convolution cones (cones 1A and 2A) of 508.

By contrast, cut selection 504 maximizes hardware parallelism for the given hardware mapping and results in an improved completion time for convolution cones 1B and 2B of 506. In other words, by modifying the traversal criteria in the case of cut 504 to account for a distribution of multiple hardware blocks in each sub-graph, hardware parallelism is maximized.

Note that the representation of convolution cones 1A, 2A, 1B, and 2B are simplified for convenience.

Inference Batch Staggering

FIG. 6 depicts examples of different batching strategies. Conventional batching in neural network inferencing is used to load weights once, and re-use those weights for each inference (e.g., each batch), since the weights are common across all inferences. This can be seen by the comparison of timeline 602, which depicts two inferences in a non-batched mode, and timeline 604, which depicts a timeline for two inferences batched in a traditional manner. As can be seen in timeline 604, the overall time for the conventional batching 610 is an improvement over time 608 for the non-batched mode. However, this improvement is limited to bandwidth savings due to reduced weight fetching from a non-local memory. The computation phase takes just as long as the non-batched mode in timeline 602, as depicted by range 616.

By contrast, staggering batches to maximize hardware parallelism, as depicted in timeline 606, further improves the completion time to 612. In this case, different hardware resources can be utilized to perform the computation of batch 2 while moving the results of batch 1 into memory as shown during interval 614.

Thus, hardware parallelism may be improved by appropriately staggering batches that account for different mappings of hardware elements to computationally-intensive or bandwidth-intensive tasks.

Example Methods for Optimizing Machine Learning Model Performance

Figure 7:
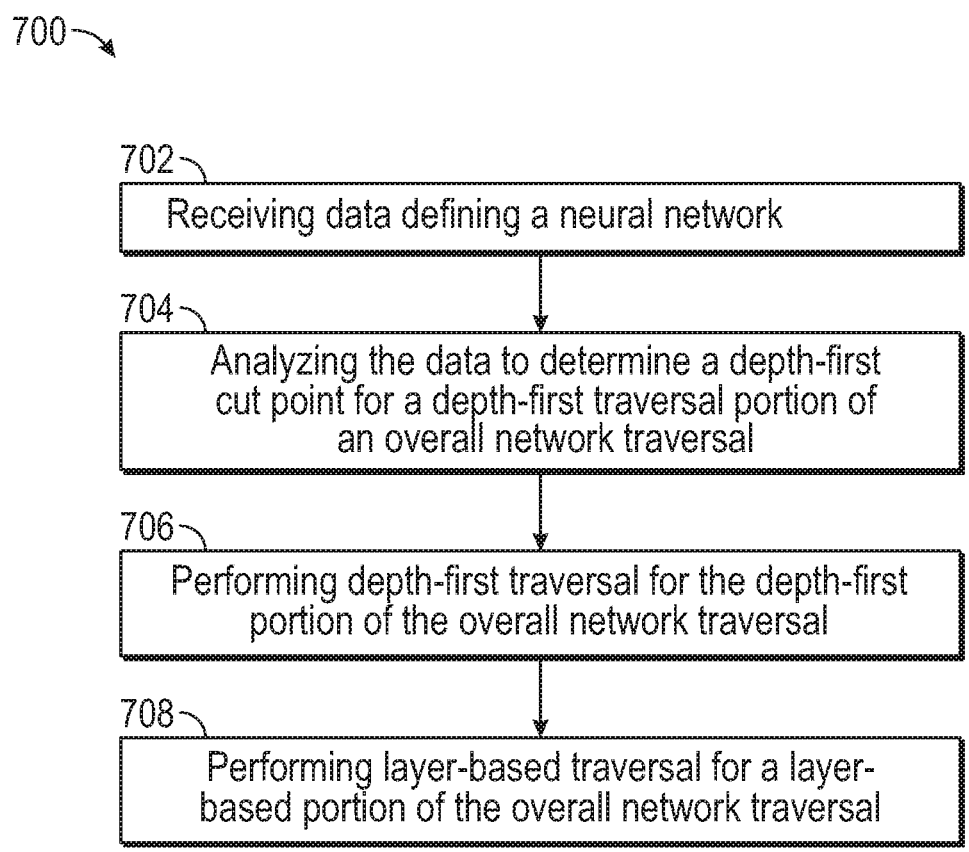
FIG. 7 depicts an example method of performing hybrid depth-first and layer-based network traversal.

FIG. 7 depicts an example method 700 of performing hybrid depth-first and layer-based network traversal.

Method 700 begins at step 702 with receiving data defining a neural network.

Method 700 then proceeds to step 704 with analyzing the data to determine a depth-first cut point for a depth-first traversal portion of an overall network traversal;

Method 700 then proceeds to step 706 with performing depth-first traversal for the depth-first portion of the overall network traversal; and Method 700 then proceeds to step 708 with performing layer-based traversal for a layer-based portion of the overall network traversal.

In some embodiments, method 700 further includes storing weight data and output data for the depth-first traversal portion in a local memory during the depth-first portion of the overall network traversal.

In some embodiments of method 700, the depth-first cut point is selected based at least in part on a sum of a weight data size and an output data size for the depth-first traversal portion being less than a capacity of the local memory.

In some embodiments of method 700, the local memory is a tightly-coupled memory (TCM). For example, the TCM may be associated with a processor configured to perform the depth-first traversal and/or the layer-based traversal.

In some embodiments of method 700, performing layer-based traversal for the layer-based portion of the overall network traversal does not require writing data to a non-local memory.

For example, in some embodiments, performing layer-based traversal for the layer-based portion of the overall network traversal includes storing weight values and input values from a non-local memory in a local memory; performing processing of a first layer of the layer-based portion of the overall network traversal using the weight values and the input values in order to generate output values; storing the output values in the local memory; and performing processing of a second layer of the layer-based portion of the overall network traversal using the weight values and the output values.

An example of method 700 is depicted and described above with respect to FIG. 3B.

Figure 8:
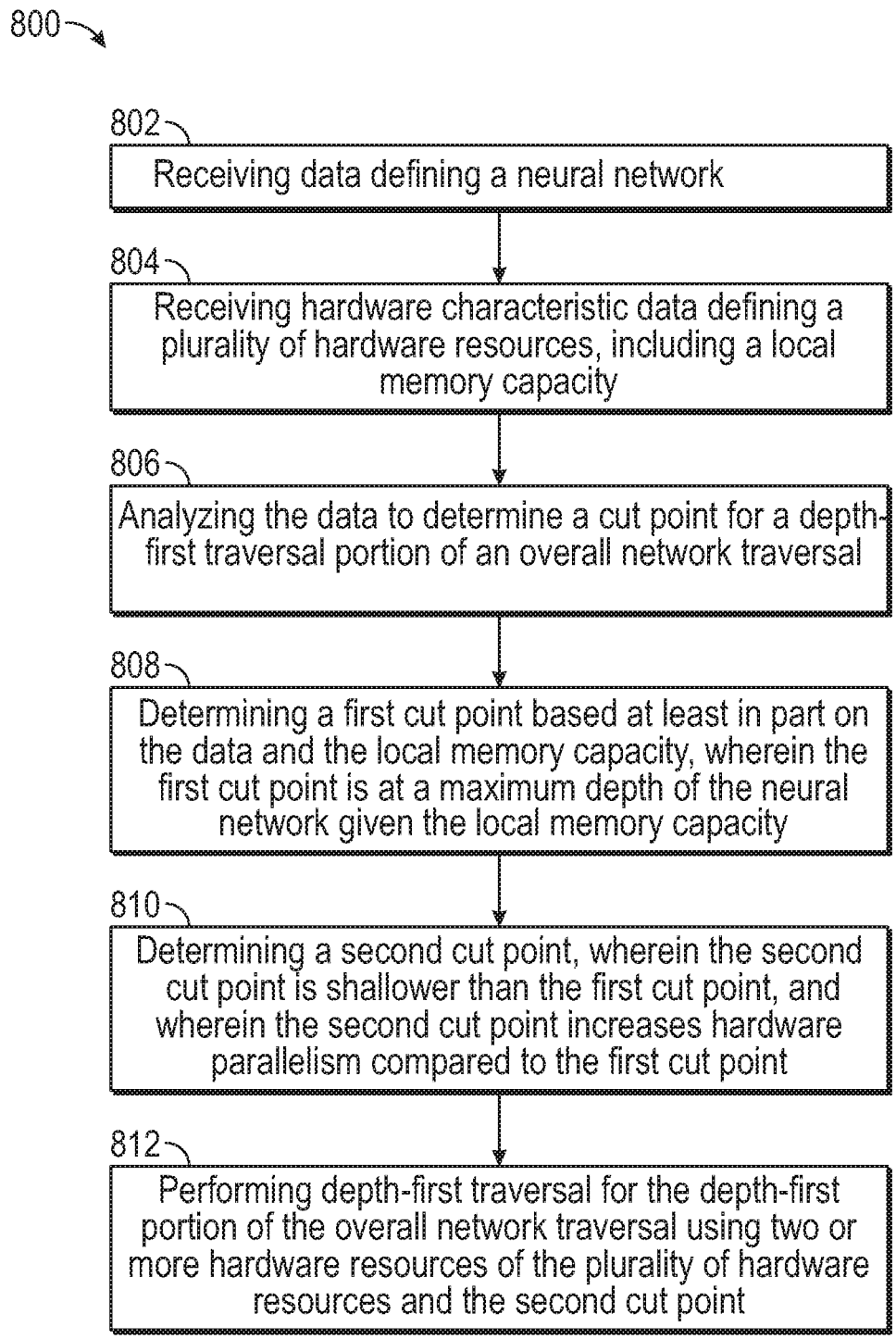
FIG. 8 depicts an example method of parallelizing hardware resources during network traversal.

FIG. 8 depicts an example method 600 of parallelizing hardware resources during network traversal.

Method 800 begins at step 802 with receiving data defining a neural network.

Method 800 then proceeds to step 804 with receiving hardware characteristic data defining a plurality of hardware resources, including a local memory capacity;

Method 800 then proceeds to step 806 with analyzing the data to determine a cut point for a depth-first traversal portion of an overall network traversal;

Method 800 then proceeds to step 808 with determining a first cut point based at least in part on the data and the local memory capacity, wherein the first cut point is at a maximum depth of the neural network given the local memory capacity;

Method 800 then proceeds to step 810 with determining a second cut point, wherein the second cut point is shallower than the first cut point, and wherein the second cut point increases hardware parallelism compared to the first cut point; and Method 800 then proceeds to step 812 with performing depth-first traversal for the depth-first traversal portion of the overall network traversal using two or more hardware resources of the plurality of hardware resource and the second cut point.

In some embodiments, method 800 further includes storing weight data and output data for the depth-first traversal portion in a local memory during the depth-first portion of the overall network traversal.

In some embodiments of method 800, the local memory is a tightly-coupled memory (TCM). For example, the TCM may be associated with a processor configured to perform the depth-first traversal.

In some embodiments of method 800, performing depth-first traversal for the depth-first traversal portion of the overall network traversal does not require writing data to a non-local memory.

In some embodiments of method 800, the second cut point enables cone parallelization during the depth-first traversal for the depth-first portion of the overall network traversal.

An example of method 800 is depicted and described above with respect to FIGS. 4C, 4D, 5A, and 5B.

Figure 9:
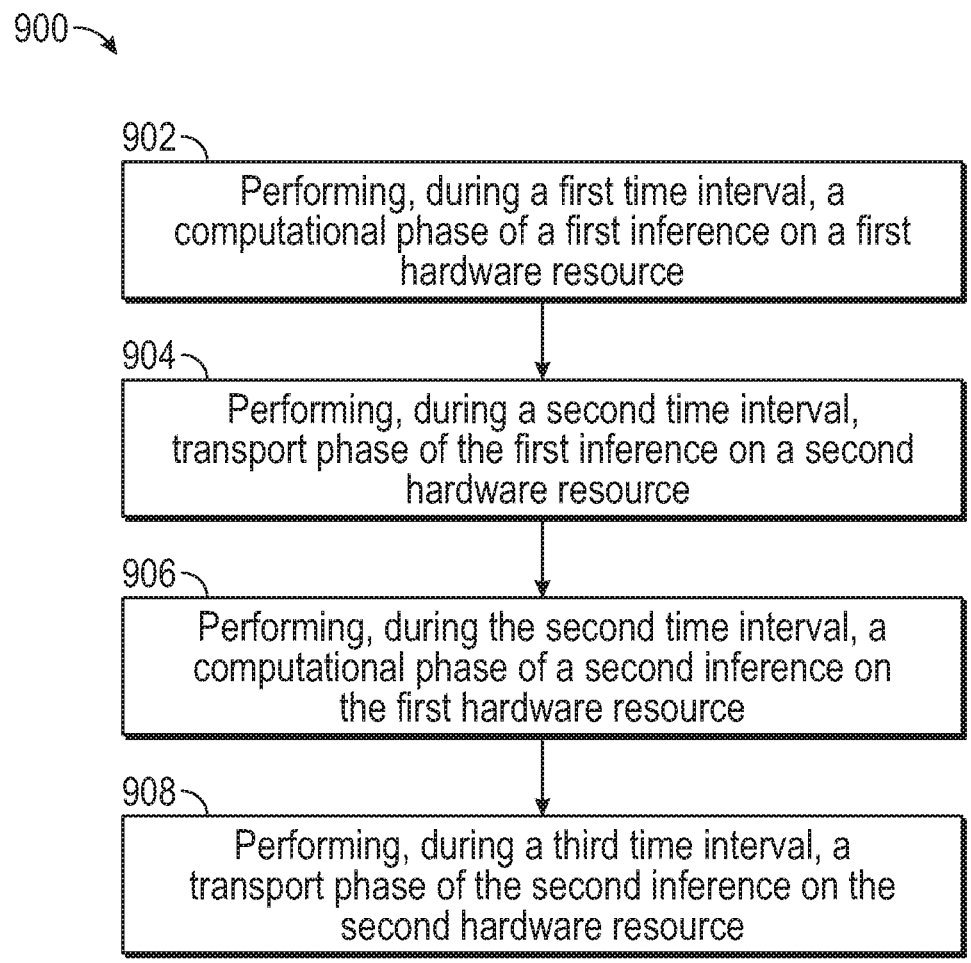
FIG. 9 depicts an example method of staggering batches of neural network processing.

FIG. 9 depicts an example method 900 of staggering batches of neural network processing.

Method 900 begins at step 902 with performing, during a first time interval, a computational phase of a first inference on a first hardware resource.

Method 900 then proceeds to step 904 with performing, during a second time interval, transport phase of the first inference on a second hardware resource;

Method 900 then proceeds to step 906 with performing, during the second time interval, a computational phase of a second inference on the first hardware resource; and Method 900 then proceeds to step 908 with performing, during a third time interval, a transport phase of the second inference on the second hardware resource.

In some embodiments of method 900, the first hardware resource is optimized for inference computation.

In some embodiments of method 900, the second hardware resource is optimized for data transport.

An example of method 900 is depicted and described above with respect to FIG. 6.

Example Processing Systems for Optimizing Machine Learning Model Performance

Figure 10:
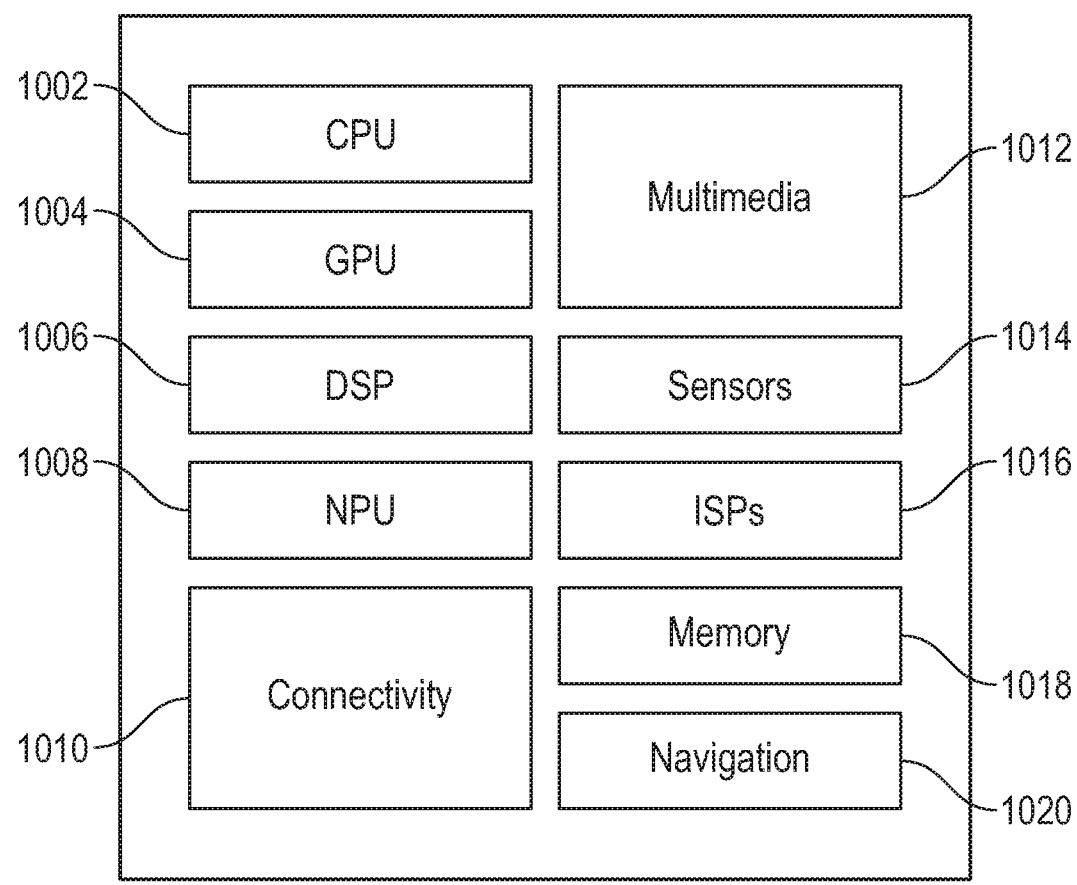
FIG. 10 illustrates an example implementation of a system-on-a-chip (SOC).

FIG. 10 illustrates an example implementation of a system-on-a-chip (SOC) 1000, which may include a central processing unit (CPU) 1002 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 1008, in a memory block associated with a CPU 1002, in a memory block associated with a graphics processing unit (GPU) 1004, in a memory block associated with a digital signal processor (DSP) 1006, in a memory block 1018, or may be distributed across multiple blocks. Instructions executed at the CPU 1002 may be loaded from a program memory associated with the CPU 1002 or may be loaded from a memory block 1018.

The SOC 1000 may also include additional processing blocks tailored to specific functions, such as a GPU 1004, a DSP 1006, a connectivity block 1010, which may include fifth generation (5G) connectivity, fourth generation long term evolution (4G LTE) connectivity, Wi-Fi connectivity, USB connectivity, Bluetooth connectivity, and the like, and a multimedia processor 1012 that may, for example, detect and recognize gestures. In one implementation, the NPU is implemented in the CPU 1002, DSP 1006, and/or GPU 1004. The SOC 1000 may also include a sensor processor 1014, image signal processors (ISPs) 1016, and/or navigation module 1020, which may include a global positioning system.

The SOC 1000 may be based on an ARM instruction set. In an aspect of the present disclosure, the instructions loaded into the CPU 1002 may comprise code to search for a stored multiplication result in a lookup table (LUT) corresponding to a multiplication product of an input value and a filter weight. The instructions loaded into the CPU 1002 may also comprise code to disable a multiplier during a multiplication operation of the multiplication product when a lookup table hit of the multiplication product is detected. In addition, the instructions loaded into the CPU 1002 may comprise code to store a computed multiplication product of the input value and the filter weight when a lookup table miss of the multiplication product is detected.

SOC 1000 and/or components thereof may be configured to perform the methods described herein.

Figure 11:
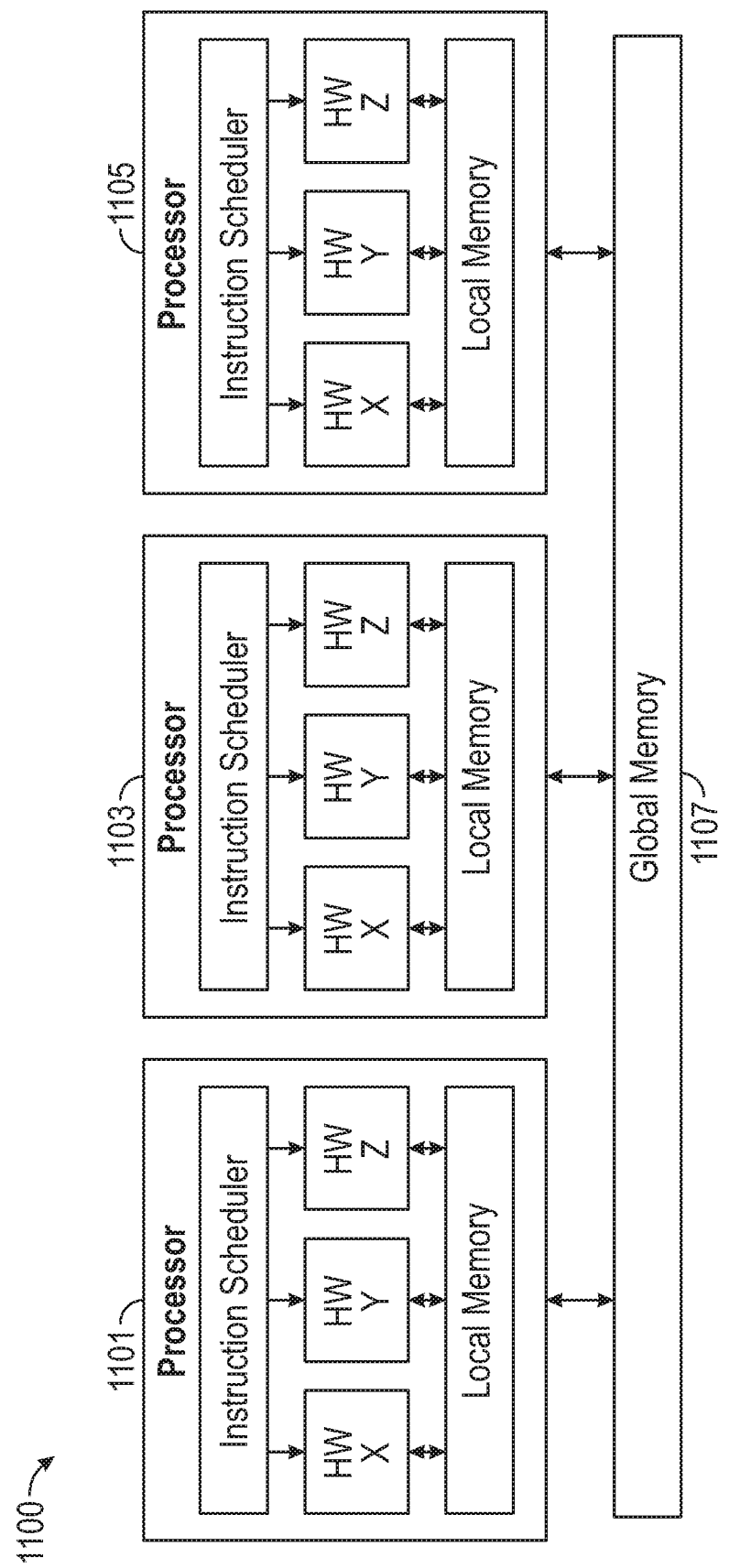
FIG. 11 depicts an example schematic diagram of a multi-processor processing system that may be implemented with embodiments described herein.

FIG. 11 depicts an example schematic diagram of a multi-processor processing system 1100 that may be implemented with embodiments described herein.

In this example, system 1100 includes processors 1101, 1103, and 1105, but in other examples, any number of individual processors may be used. Further, though depicted similarly, processors 1101, 1103, and 1105 may be representative of various different kinds of processors in an electronic device, such as CPUs, GPUs, DSPs, NPUs, and the like as described herein.

Each of processors 1101, 1103, and 1105 includes an instruction scheduler, various hardware sub-components (e.g., hardware X, hardware Y, and hardware Z), and a local memory. As described above, the local memory may be a tightly coupled memory (TCM). Note that the components of each of processors 1101, 1103, and 1105 is shown as the same in this example, each of the processors may have different hardware configurations, different hardware elements, etc.

Each of processors 1101, 1103, and 1105 is also in data communication with a global memory, such as a DDR memory, or other types of volatile working memory.

In some implementations, in a multi-processor processing system such as 1100, one of the processors may act as a master processor. For example, processor 1101 may be a master processor in this example. A master processor may include a compiler that, when executed, can determine how a model, such as a neural network, will be processed by various components of processing system 1100. For example, hardware parallelism may be implemented by mapping portions of the processing of a model to various hardware (e.g., hardware X, hardware Y, and hardware Z) within a given processor (e.g., processor 1101) as well as mapping portions of the processing of the model to other processors (e.g., processors 1103 and 1105) and their associated hardware, such as shown above in FIGS. 4B, 4D, 5B, and 6.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving data defining a neural network;
analyzing the data to determine a depth-first cut point for a depth-first traversal portion of an overall network traversal;
performing depth-first traversal for the depth-first traversal portion of the overall network traversal;
storing weight data and output data for the depth-first traversal portion in a local memory during the depth-first portion of the overall network traversal; and
performing layer-based traversal for a layer-based portion of the overall network traversal.

2. The method of claim 1, further comprising: determining the depth-first cut point based at least in part on a sum of a weight data size and an output data size for the depth-first traversal portion being less than a capacity of the local memory.

3. The method of claim 2, wherein the local memory is a tightly-coupled memory (TCM) associated with a processor configured to perform the depth-first traversal and the layer-based traversal.

4. The method of claim 1, wherein performing layer-based traversal for the layer-based portion of the overall network traversal comprises:
storing weight values and input values from a non-local memory in the local memory;
performing processing of a first layer of the layer-based portion of the overall network traversal using the weight values and the input values in order to generate output values;
storing the output values in the local memory; and
performing processing of a second layer of the layer-based portion of the overall network traversal using the weight values and the output values.

5. The method of claim 2, wherein the depth-first cut point is determined by a compiler based on the capacity of the local memory.

6. A processing system, comprising:
a memory comprising computer-executable instructions; and
a processor configured to execute the computer-executable instructions and cause the processing system to:
receive data defining a neural network;
analyze the data to determine a depth-first cut point for a depth-first traversal portion of an overall network traversal;
perform depth-first traversal for the depth-first traversal portion of the overall network traversal;
store weight data and output data for the depth-first traversal portion in a local memory during the depth-first portion of the overall network traversal; and
perform layer-based traversal for a layer-based portion of the overall network traversal.

7. The processing system of claim 6, wherein the processor is further configured to determine the depth-first cut point based at least in part on a sum of a weight data size and an output data size for the depth-first traversal portion being less than a capacity of the local memory.

8. The processing system of claim 7, wherein the local memory is a tightly-coupled memory (TCM) associated with a processor configured to perform the depth-first traversal and the layer-based traversal.

9. The processing system of claim 6, wherein in order to perform the layer-based traversal for the layer-based portion of the overall network traversal, the processor is further configured to:
store weight values and input values from a non-local memory in the local memory;
perform processing of a first layer of the layer-based portion of the overall network traversal using the weight values and the input values in order to generate output values;
store the output values in the local memory; and
perform processing of a second layer of the layer-based portion of the overall network traversal using the weight values and the output values.

10. The processing system of claim 7, wherein the depth-first cut point is determined by a compiler based on the capacity of the local memory.

11. A method, comprising:
receiving data defining a neural network;
receiving hardware characteristic data defining a plurality of hardware resources, including a local memory capacity;
analyzing the data to determine a cut point for a depth-first traversal portion of an overall network traversal;
determining a first cut point based at least in part on the data and the local memory capacity, wherein the first cut point is at a maximum depth of the neural network given the local memory capacity;
determining a second cut point, wherein the second cut point is shallower than the first cut point, and wherein the second cut point increases hardware parallelism compared to the first cut point; and performing depth-first traversal for the depth-first portion of the overall network traversal using two or more hardware resources of the plurality of hardware resources and the second cut point.

12. The method of claim 11, further comprising: storing weight data and output data for the depth-first traversal portion in a local memory during the depth-first portion of the overall network traversal.

13. The method of claim 12, wherein the local memory is a tightly-coupled memory (TCM).

14. The method of claim 11, wherein performing depth-first traversal for the depth-first traversal portion of the overall network traversal does not require writing data to a non-local memory.

15. The method of claim 11, wherein the second cut point enables cone parallelization during the depth-first traversal for the depth-first portion of the overall network traversal.

16. A method, comprising:
receiving data defining a neural network;
analyzing the data to determine a depth-first cut point for a depth-first traversal portion of an overall network traversal;
performing depth-first traversal for the depth-first traversal portion of the overall network traversal; and
performing layer-based traversal for a layer-based portion of the overall network traversal, wherein performing layer-based traversal for the layer-based portion of the overall network traversal comprises:
storing weight values and input values from a non-local memory in the local memory;
performing processing of a first layer of the layer-based portion of the overall network traversal using the weight values and the input values in order to generate output values;
storing the output values in the local memory; and
performing processing of a second layer of the layer-based portion of the overall network traversal using the weight values and the output values.

* * * * *